(12) United States Patent
Li et al.

(10) Patent No.: US 11,042,761 B2
(45) Date of Patent: Jun. 22, 2021

(54) METHOD AND SYSTEM FOR SENSING AN OBSTACLE, AND STORAGE MEDIUM

(71) Applicant: Baidu Online Network Technology (Beijing) Co., Ltd., Beijing (CN)

(72) Inventors: Guo Li, Beijing (CN); Han Gao, Beijing (CN); Xun Sun, Beijing (CN); Tian Xia, Beijing (CN)

(73) Assignee: Baidu Online Network Technology (Beijing) Co., LTD., Beijing (CN)

( * ) Notice: Subject to any disclaimer, the term of this patent is extended or adjusted under 35 U.S.C. 154(b) by 77 days.

(21) Appl. No.: 16/512,130

(22) Filed: Jul. 15, 2019

(65) Prior Publication Data
US 2020/0082181 A1    Mar. 12, 2020

(30) Foreign Application Priority Data
Sep. 6, 2018   (CN) .......................... 201811039205.5

(51) Int. Cl.
*G06K 9/00* (2006.01)
*G06T 7/292* (2017.01)
(Continued)

(52) U.S. Cl.
CPC .......... *G06K 9/00805* (2013.01); *G01C 11/08* (2013.01); *G01V 8/20* (2013.01);
(Continued)

(58) Field of Classification Search
CPC ............. G06K 9/00805; G06K 9/6215; G06K 9/00771; G06K 9/00214; G06K 9/00369;
(Continued)

(56) References Cited

U.S. PATENT DOCUMENTS

| 6,025,790 A * | 2/2000 | Saneyoshi | G05D 1/0251 340/946 |
| 2004/0056950 A1* | 3/2004 | Takeda | G08G 1/166 348/92 |

(Continued)

FOREIGN PATENT DOCUMENTS

| CN | 1924514 A | 3/2007 |
| CN | 101438590 A | 5/2009 |

(Continued)

OTHER PUBLICATIONS

Office Action dated May 29, 2019 for Chinese Application No. 2018110392055, 19 pages.

(Continued)

*Primary Examiner* — Jose L Couso
(74) *Attorney, Agent, or Firm* — Knobbe, Martens, Olson & Bear, LLP

(57) ABSTRACT

Embodiments of a method and system for sensing an obstacle, a computer device, and a computer-readable storage medium are provided. The method can include: capturing continuously, by first and second cameras adjacently arranged on a motor vehicle, obstacles around the motor vehicle, to obtain at least a first obstacle image and a second obstacle image respectively; associating the first obstacle image with the second obstacle image; determining whether the first obstacle image and the second obstacle image comprise the same obstacle. By means of some of the disclosed methods and systems, an obstacle can be real-time sensed by a motor vehicle in a large field of view, such as, a range of 360° around the vehicle.

17 Claims, 11 Drawing Sheets

(51) Int. Cl.
*G01C 11/08* (2006.01)
*G01V 8/20* (2006.01)
*G06K 9/62* (2006.01)
*G06T 11/20* (2006.01)
*H04N 5/247* (2006.01)
*B60R 11/04* (2006.01)
*H04N 5/225* (2006.01)

(52) U.S. Cl.
CPC ............ *G06K 9/6215* (2013.01); *G06T 7/292* (2017.01); *G06T 11/20* (2013.01); *H04N 5/247* (2013.01); *B60R 11/04* (2013.01); *G06T 2207/30252* (2013.01); *G06T 2210/12* (2013.01); *H04N 5/2253* (2013.01)

(58) Field of Classification Search
CPC ...... G06K 9/6202; G06K 9/3241; G06K 9/46; G06K 9/0362; G06K 2009/3291; G06K 2009/4666; G06T 3/4038; G06T 7/292; G06T 7/33; G06T 7/55; G06T 7/74; G06T 11/20; G06T 2207/30252; G06T 2207/10016; G06T 2207/30196; G06T 2207/30232; G06T 2207/10012; G06T 2207/10021; G06T 2210/12; G01C 11/08; G01C 11/04; G01V 8/20; H04N 5/247; H04N 5/2253; H04N 5/23238; H04N 13/10; H04N 13/239; H04N 13/249; B60R 11/04; B60R 1/00; B60R 21/0134; B60R 2300/102; B60R 2300/303; B60R 2300/607; B60R 2300/8093; B60R 2300/105; B60R 2300/307; G05D 1/0251; G05D 1/0274; G08G 1/16; G08G 1/166; B60K 31/0008; B60W 30/095; B60W 2420/42

See application file for complete search history.

(56) References Cited

U.S. PATENT DOCUMENTS

| | | | |
|---|---|---|---|
| 2008/0130954 A1* | 6/2008 | Taniguchi | G06K 9/00369 382/104 |
| 2008/0285799 A1* | 11/2008 | Chiu | G06T 7/97 382/103 |
| 2013/0253796 A1* | 9/2013 | Luo | G08G 1/166 701/96 |
| 2015/0002620 A1* | 1/2015 | Shin | B60W 30/095 348/36 |
| 2015/0049195 A1* | 2/2015 | Ishigaki | G06F 16/583 348/148 |
| 2015/0202939 A1* | 7/2015 | Stettner | B60R 21/0134 701/37 |
| 2016/0098606 A1* | 4/2016 | Nakamura | G06K 9/00805 382/103 |
| 2016/0335489 A1* | 11/2016 | Shigemura | H04N 7/181 |
| 2017/0154241 A1* | 6/2017 | Shambik | B60R 11/04 |
| 2018/0209122 A1* | 7/2018 | Kiyota | G08B 13/19641 |
| 2018/0330175 A1* | 11/2018 | Corcoran | G06K 9/209 |
| 2019/0286916 A1* | 9/2019 | Yan | G06K 9/6211 |
| 2021/0056713 A1* | 2/2021 | Rangesh | G06K 9/6267 |

FOREIGN PATENT DOCUMENTS

| | | |
|---|---|---|
| CN | 107580199 A | 1/2018 |
| JP | 2006025086 | 1/2006 |
| JP | 2015057690 | 3/2015 |
| JP | 2015064778 A | 4/2015 |
| JP | 2014215039 B | 2/2017 |
| WO | 2016147644 A1 | 9/2016 |

OTHER PUBLICATIONS

Search Report dated May 21, 2019 for Chinese Application No. 2018110392055, 6 pages.
European Search Report dated Jan. 22, 2020 for Application No. 19184574.2, 15 pages.
Japanese Office Action dated Sep. 2, 2020 in Japanese Patent Application No. JP20190118557. 8 pages.

* cited by examiner associating the first obstacle image with the
second obstacle image
104 associating the first obstacle image with the second obstacle image based on an image box feature with respect to the first obstacle image and the second obstacle image, in a case that a field of view of the first camera overlaps with a field of view of the second camera
108 associating the first obstacle image with the second obstacle image by estimating a motion equation within a time period from a time when the obstacle just disappears from the field of view of the first camera to a time when the obstacle just enters the field of view of the second camera, in a case that a field of view of the first camera does not overlap with a field of view of the second camera
112 forming a second image box by projecting a first image box of the first obstacle image into an imaging plane of the second camera via a reference coordinate system, and comparing the second image box with a third image box of the second obstacle image, to determine whether the second image box and the third image box include the same obstacle according to an image box feature with respect to the second image box and the third image box
110 converting first coordinates of the first image box of the first obstacle image into reference coordinates of a reference coordinate system; updating continuously the reference coordinates with the estimated motion equation; projecting the latest updated reference coordinates into an imaging plane of the second camera to obtain second coordinates when the obstacle just enters the field of view of the second camera; and comparing the second image box of the first obstacle image formed by the second coordinates with the third image box of the second obstacle image captured at a time when the obstacle just enters the field of view of the second camera, to determine whether the second image box and the third image box include the same obstacle according to an image box feature with respect to the second image box and the third image box
114

FIG. 2 estimating the motion equation
116

| estimating the motion equation in condition of a uniform motion 118 | estimating the motion equation in condition of a uniformly accelerated motion 120 | estimating the motion equation in condition of a uniformly decelerated motion 122 |

FIG. 3 determining whether the first obstacle image and the second obstacle image include the same obstacle
106

| determining according to a type of the obstacle 132 | determining according to a moving velocity of the obstacle 134 | determining according to a moving direction of the obstacle 136 | determining according to an image box feature 138 |

FIG. 6 fields of view of two adjacent cameras overlap fields of view of two adjacent cameras do not overlap

METHOD AND SYSTEM FOR SENSING AN OBSTACLE, AND STORAGE MEDIUM

CROSS-REFERENCE TO RELATED APPLICATION

This application claims priority to Chinese Patent Application No. 201811039205.5, filed on Sep. 6, 2018, which is hereby incorporated by reference in its entirety.

TECHNICAL FIELD

The present application relates to the field of motor vehicle driving, and in particular, to a method and system for sensing an obstacle, and a computer storage medium.

BACKGROUND

In existing unmanned vehicles, the road condition in a specific angular direction is often sensed by a single camera. The visual sensing based on a single camera is different from that of a laser radar, and the sensing rang is very small, which usually depends on the camera's field of view (fov). The camera's field of view (fov) is generally less than 180 degrees, and sometimes the field of view can't be too large taking account of the sensing distance. Therefore, only the road condition in a specific angular direction is sensed by a single camera, and an obstacle that is not in the field of view cannot be sensed. In a case that the obstacle is too close to a main car (an unmanned vehicle), it is easy to cause an accident such as emergency braking and collision. Even worse, during a period when an obstacle just appears in the field of view, because the image box of the obstacle for detection is in a truncated state, the image box is not completed, such that the 3D position of the obstacle cannot be estimated accurately. As a result, the velocity of the obstacle cannot be estimated accurately by the sensing system, and wrong information is inputted to the decision system of the unmanned vehicle, such that the unmanned vehicle cannot run properly.

SUMMARY

A method, a system and a computer device for sensing an obstacle, and a computer readable storage medium are provided according to embodiments of the present application, so as to at least solve the above technical problems in the existing technology.

According to a first aspect, a method for sensing an obstacle includes:

capturing continuously, by at least two cameras, obstacles around the motor vehicle, to obtain at least a first obstacle image and a second obstacle image respectively, wherein the at least two cameras comprises first and second cameras adjacently arranged on a motor vehicle;

associating the first obstacle image with the second obstacle image;

determining whether the first obstacle image and the second obstacle image include the same obstacle.

In conjunction with the first aspect, in a first implementation of the first aspect of the present application, the associating the first obstacle image with the second obstacle image includes:

associating the first obstacle image with the second obstacle image based on an image box feature with respect to the first obstacle image and the second obstacle image, in a case that a field of view of the first camera overlaps with a field of view of the second camera.

In conjunction with the first implementation of first aspect, in a second implementation of the first aspect of the present application, the associating the first obstacle image with the second obstacle image based on an image box feature with respect to the first obstacle image and the second obstacle image includes:

forming a second image box by projecting a first image box of the first obstacle image into an imaging plane of the second camera via a reference coordinate system, and comparing the second image box with a third image box of the second obstacle image, to determine whether the second image box and the third image box include the same obstacle according to an image box feature with respect to the second image box and the third image box.

In conjunction with the first implementation of first aspect, in a third implementation of the first aspect of the present application, in a case that a field of view of the first camera does not overlap with a field of view of the second camera, the first obstacle image is associated with the second obstacle image by estimating a motion equation within a time period from a time when the obstacle just disappears from the field of view of the first camera to a time when the obstacle just enters the field of view of the second camera.

In conjunction with the third implementation of first aspect, in a fourth implementation of the first aspect of the present application, the associating the first obstacle image with the second obstacle image includes:

converting first coordinates of the first image box of the first obstacle image into reference coordinates of a reference coordinate system, updating continuously the reference coordinates with the estimated of motion equation, projecting the latest updated reference coordinates into an imaging plane of the second camera to obtain second coordinates when the obstacle just enters the field of view of the second camera, and comparing the second image box of the first obstacle image formed by the second coordinates with the third image box of the second obstacle image captured at a time when the obstacle just enters the field of view of the second camera, to determine whether the second image box and the third image box include the same obstacle according to an image box feature with respect to the second image box and the third image box.

In conjunction with the fourth implementation of first aspect, in a fifth implementation of the first aspect of the present application, the estimating a motion equation includes estimating a motion equation in condition of a uniform motion, a uniformly accelerated motion or a uniformly decelerated motion.

In conjunction with a first implementation of the first aspect, a second implementation of the first aspect, a fourth implementation of the first aspect and a fifth implementation of the first aspect, in a sixth implementation of the first aspect of the present application, the image box feature includes a central distance between the second image box and the third image box, an aspect ratio of each image box, and/or an intersection over union of the second image box and the third image box.

In conjunction with the first aspect, a first implementation of the first aspect, a second implementation of the first aspect, a third implementation of the first aspect, in a fourth implementation of the first aspect of the present application and a fifth implementation of the first aspect, in a seventh implementation of the first aspect of the present application, the at least two cameras are arranged on the left front, on the left rear, on the front, on the rear, on the right front, and on the right rear of a body of the motor vehicle, respectively, to sense obstacles within 360° around the body of the motor vehicle.

In conjunction with the first aspect, a first implementation of the first aspect, a second implementation of the first aspect, a third implementation of the first aspect, in a fourth implementation of the first aspect of the present application and a fifth implementation of the first aspect, in an eighth implementation of the first aspect of the present application, the determining whether the first obstacle image and the second obstacle image include the same obstacle image includes:

determining whether the first obstacle image and the second obstacle image include the same obstacle image according to a type of the obstacle, a moving velocity of the obstacle, a moving direction of the obstacle, and/or an image box feature.

According to a second aspect, a system for sensing an obstacle includes:

at least two cameras, configured to continuously capture obstacles around the motor vehicle, to obtain at least a first obstacle image and a second obstacle image respectively, wherein the at least two cameras comprises first and second cameras adjacently arranged on a motor vehicle;

an association unit, configured to associate the first obstacle image with the second obstacle image; and a determination unit, configured to determine whether the first obstacle image and the second obstacle image include the same obstacle.

In conjunction with the second aspect, in a first implementation of the second aspect of the present application, the association unit is further configured to associate the first obstacle image with the second obstacle image based on an image box feature with respect to the first obstacle image and the second obstacle image, in a case that a field of view of the first camera overlaps with a field of view of the second camera.

In conjunction with the first implementation of the second aspect, in a second implementation of the second aspect of the present application, the association unit is further configured to form a second image box by projecting a first image box of the first obstacle image into an imaging plane of the second camera via a reference coordinate system, and to compare the second image box with a third image box of the second obstacle image, to determine whether the second image box and the third image box include the same obstacle according to an image box feature with respect to the second image box and the third image box.

In conjunction with the first implementation of second aspect, in a third implementation of the second aspect of the present application, the association unit is further configured to, in a case that a field of view of the first camera does not overlap with a field of view of the second camera, associate the first obstacle image with the second obstacle image by estimating a motion equation within a time period from a time when the obstacle just disappears from the field of view of the first camera to a time when the obstacle just enters the field of view of the second camera.

In conjunction with the third implementation of second aspect, in a fourth implementation of the second aspect of the present application, the association unit is further configured to:

convert first coordinates of the first image box of the first obstacle image into reference coordinates of a reference coordinate system, update continuously the reference coordinates with the estimated motion equation, project the latest updated reference coordinates into an imaging plane of the second camera to obtain second coordinates when the obstacle just enters the field of view of the second camera, and compare the second image box of the first obstacle image formed by the second coordinates with the third image box of the obstacle image captured at a time when the obstacle just enters the field of view of the second camera, to determine whether the second image box and the third image box include the same obstacle according to an image box feature with respect to the second image box and the third image box.

In conjunction with the fourth implementation of second aspect, in a fifth implementation of the second aspect of the present application, the estimating a motion equation includes estimating a motion equation in condition of a uniform motion, a uniformly accelerated motion or a uniformly decelerated motion.

In conjunction with a first implementation of the second aspect, a second implementation of the second aspect, a fourth implementation of the second aspect and a fifth implementation of the second aspect, in a sixth implementation of the second aspect of the present application, the image box feature includes a central distance between the second image box and the third image box, an aspect ratio of each image box, and/or an intersection over union of the second image box and the third image box.

In conjunction with the second aspect, a first implementation of the second aspect, a second implementation of the second aspect, a third implementation of the second aspect, in a fourth implementation of the second aspect of the present application and a fifth implementation of the second aspect, in a seventh implementation of the second aspect of the present application, the at least two cameras are arranged on the left front, on the left rear, on the front, on the rear, on the right front, and on the right rear of a body of the motor vehicle, respectively, to sense obstacles within 360° around the body of the motor vehicle.

In conjunction with the second aspect, a first implementation of the second aspect, a second implementation of the second aspect, a third implementation of the second aspect, in a fourth implementation of the second aspect of the present application and a fifth implementation of the second aspect, in a seventh implementation of the second aspect of the present application, the determination unit is further configured to determine whether the first obstacle image and the second obstacle image include the same obstacle image according to a type of the obstacle, a moving velocity of the obstacle, a moving direction of the obstacle, and/or an image box feature.

In a third aspect, a computer device is provided according to an embodiment of the present application, the computer device includes: one or more processors; and a storage device configured to store one or more programs, wherein the one or more programs, when executed by the one or more processors, cause the one or more processors to implement the above method.

In a fourth aspect, a computer-readable storage medium is provided according to an embodiment of the present application, in which a computer program is stored, wherein the computer program, when executed by a processor, causes the processor to implement the above method.

By means of the method and system of the present application for sensing an obstacle, for example, an obstacle can be real-time sensed by a motor vehicle in large range of field of view, such as, a 360° range around the vehicle. In the case of large range of field of view, the movement state (position, velocity, etc.) of an obstacle in a certain range from a motor vehicle, such as an unmanned vehicle, can be integrally described in the method and system for sensing an obstacle. For example, by accurately estimating a position, a velocity, a direction and a type of an obstacle, the precise information is provided for the decision-making system of motor vehicles, such as unmanned vehicles, to prevent high-risk such as collisions.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

FIG. 2 schematically shows a schematic diagram of associating an obstacle image captured by one camera with an obstacle image captured by another camera according to an embodiment of the first aspect in the present application;

FIG. 3 schematically shows a schematic diagram of estimation of motion equation according to an embodiment of the first aspect in the present application;

FIG. 6 schematically shows a schematic diagram of determining whether an obstacle image captured by one camera and an obstacle image captured by another camera include the same obstacle according to an embodiment of the first aspect in the present application;

DETAILED DESCRIPTION OF THE EMBODIMENTS

The embodiments of the present disclosure will be described in more detail below with reference to the accompanying drawings. While some embodiments of the present disclosure are shown in the accompanying drawings, it should be understood that the present disclosure may be implemented in various forms and should not be construed as being limited to the embodiments set forth herein, instead providing these embodiments for a more thorough and complete understanding of the present disclosure. It should be understood that the accompanying drawings and embodiments of the present disclosure are only examples and are not intended to limit the scope of protection of the present disclosure.

In the description of the embodiments of the present disclosure, the term "including" and similar terms thereof shall be understood as open inclusion, i.e., "including, but not limited to". The term "based on" should be understood as "based at least in part on". The term "an embodiment" or "the embodiment" should be understood as "at least one embodiment". Other explicit and implicit definitions may also be included below.

The following is described in detail with reference to FIGS. 1-11 of the present application.

Figure 1:
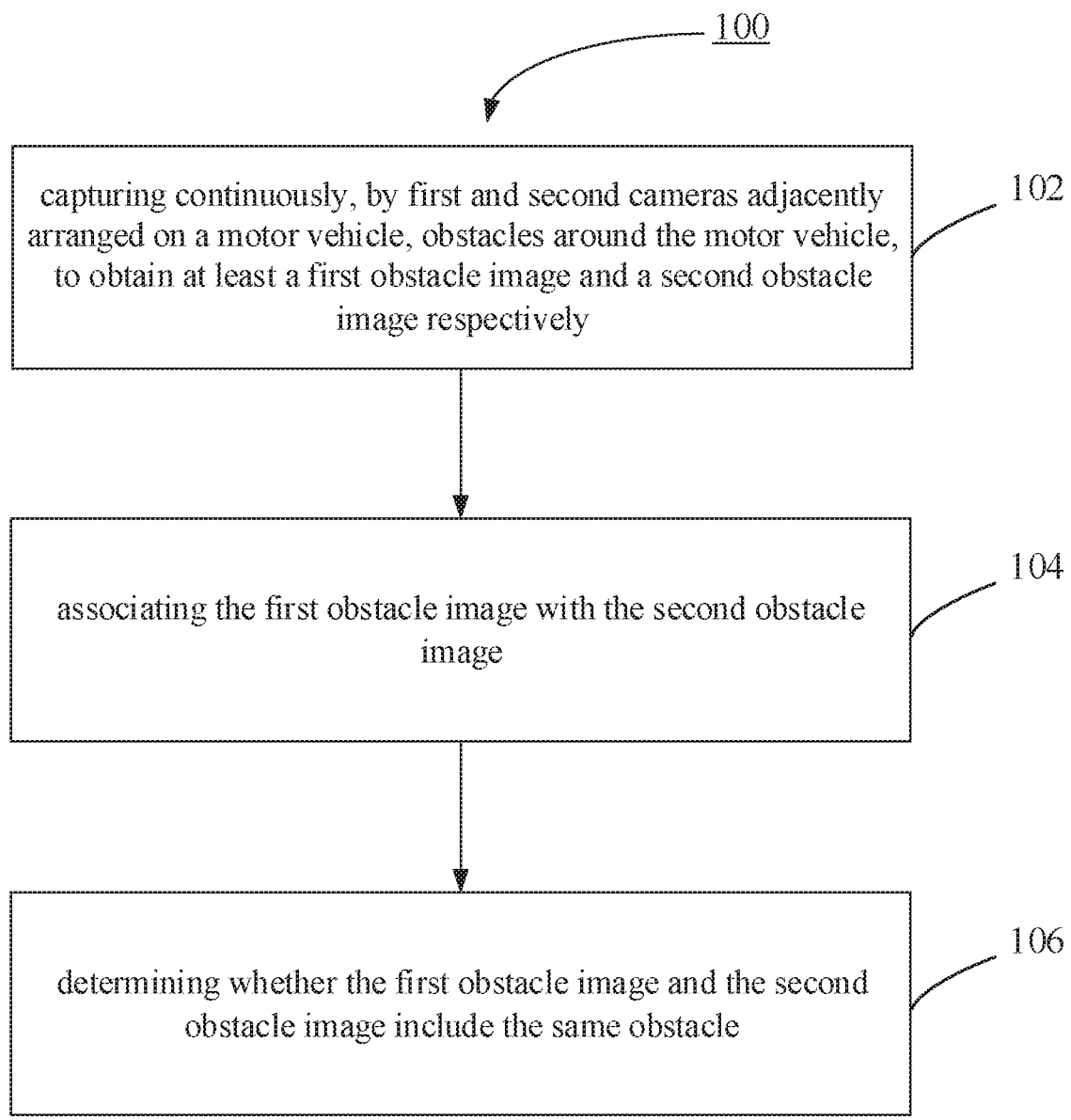
FIG. 1 schematically shows a schematic diagram of a method for sensing an obstacle according to an embodiment of the first aspect in the present application.

FIG. 1 schematically shows a schematic diagram of a method 100 for sensing an obstacle according to an embodiment of the first aspect in the present application. The method may include the following steps: Step 102, capturing continuously, by first and second cameras adjacently arranged on a motor vehicle, obstacles around the motor vehicle, to obtain at least a first obstacle image and a second obstacle image respectively; Step 104, associating the first obstacle image with the second obstacle image; Step 106, determining whether the first obstacle image and the second obstacle image include the same obstacle.

Figure 5:
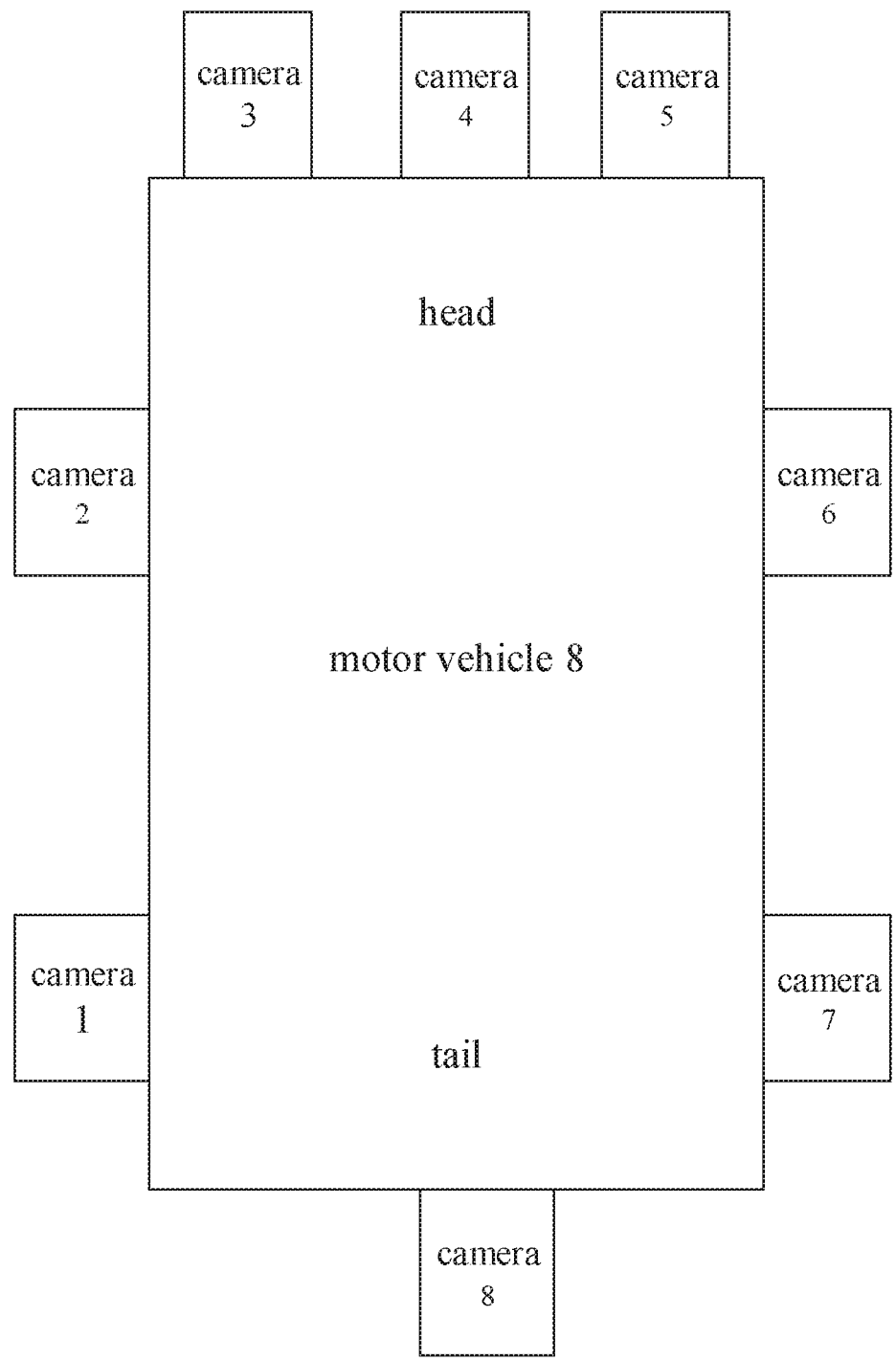
FIG. 5 schematically shows a schematic diagram of a motor vehicle around which cameras are arranged according to an embodiment of the first aspect in the present application.
Figure 10:
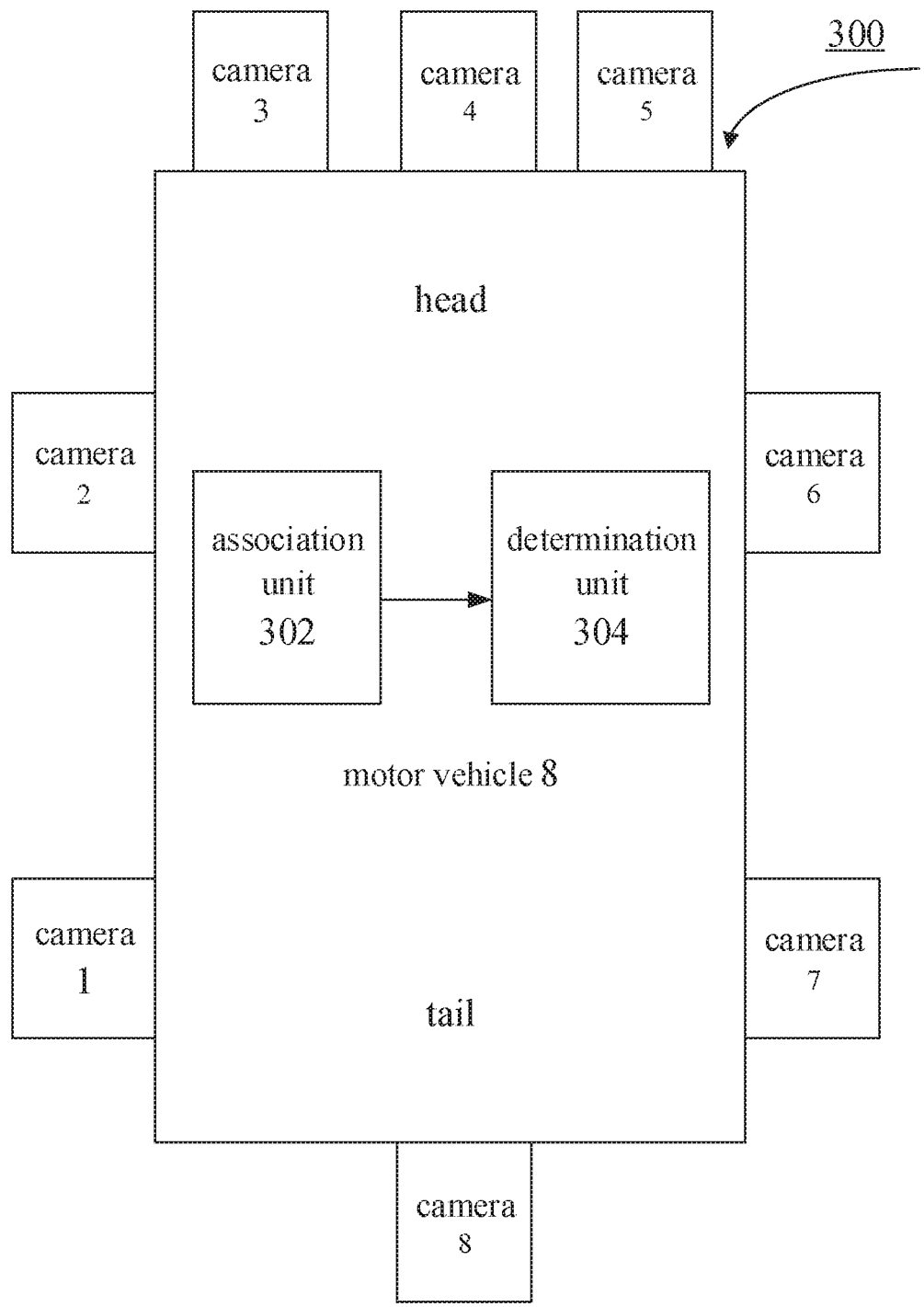
FIG. 10 schematically shows a schematic diagram of system for sensing an obstacle according to an embodiment of the second aspect of the present application.

It is shown here that at least two adjacent cameras may be arranged on the motor vehicle, and more cameras may be arranged as required. For example, at least two adjacent cameras on the motor vehicle may include a plurality of cameras arranged on the left front, on the left rear, on the front, on the rear, on the right front, and on the right rear of the body of the motor vehicle, respectively. As shown in FIGS. 5 and 10, it is possible to sense obstacles in a large field of view such as 360°, around the motor vehicle. Since each camera has its own visual field, i.e., field of view, it can be understood by those skilled in the art that a plurality of cameras such as 6 cameras or 8 cameras may be arranged as required, in a case that it is required to sense obstacles in a large field of view or visual field such as 360° around a motor vehicle.

For example, in the schematic diagram shown in FIGS. 5 and 10, eight cameras are arranged around the motor vehicle 8, namely, a camera 2 on the left front of the body; a camera 1 on the left rear of the body; a camera 3, a camera 4 and a camera 5 on the front of the body; a camera 8 on the rear of the body, a camera 6 on the right front of the body, and a camera 7 on the right rear of the body.

The term "obstacles" mentioned in various embodiments of the specification in the present application may be understood broadly, for example, pedestrians, bicycles, electric vehicles, other non-motor vehicles or motor vehicles around a motor vehicle may be regarded as obstacles relative to this vehicle (the motor vehicle).

It should be noted that the term "obstacle image" appearing in various embodiments of the present application, may include multiple obstacle images. For example, the "obstacle image" may include an image of a pedestrian, a bicycle, an electric vehicle, another non-motor vehicle or motor vehicle, and so on.

The term "camera" mentioned in various embodiments of the specification in the present application may be understood broadly, for example, the "camera" may include a fish-eye camera, a wide-angle camera, and so on.

The terms "reference coordinate system" and "reference coordinate" mentioned in the embodiments of the specification in the present application may be understood broadly, and may, for example, include a vehicle body coordinate in a vehicle body coordinate system, a world coordinate in a world coordinate system, and another coordinate system, as long as the conversion relationship of two adjacent cameras to this coordinate system is known.

Obstacles around the motor vehicle are captured continuously by at least two adjacent cameras arranged on the motor vehicle, which is helpful to sense obstacles such as other motor vehicles, and is helpful to fully describe the movement state (position, velocity, etc.) of an obstacle within a specific range from the motor vehicle such as an unmanned vehicle. For example, the precise information is provided for a decision system of a motor vehicle such as an unmanned vehicle by accurately estimating the position, velocity, moving direction and type of an obstacle, to avoid high risk such as collision.

FIG. 2 schematically shows a schematic diagram of associating an obstacle image captured by one camera with an obstacle image captured by another camera according to an embodiment of the first aspect in the present application. In an embodiment, the step 104 of associating the first obstacle image with the second obstacle image may include the following step: step 108, associating the first obstacle image with the second obstacle image based on an image box feature with respect to the first obstacle image and the second obstacle image, in a case that a field of view of the first camera overlaps with a field of view of the second camera. In an embodiment of the present application, the step 108 of associating the first obstacle image with the second obstacle image based on an image box feature with respect to the first obstacle image and the second obstacle image includes: step 110, forming a second image box by projecting a first image box of the first obstacle image into an imaging plane of the second camera via a reference coordinate system, and comparing the second image box with a third image box of the second obstacle image, to determine whether the second image box and the third image box include the same obstacle according to an image box feature with respect to the second image box and the third image box.

Figure 7:
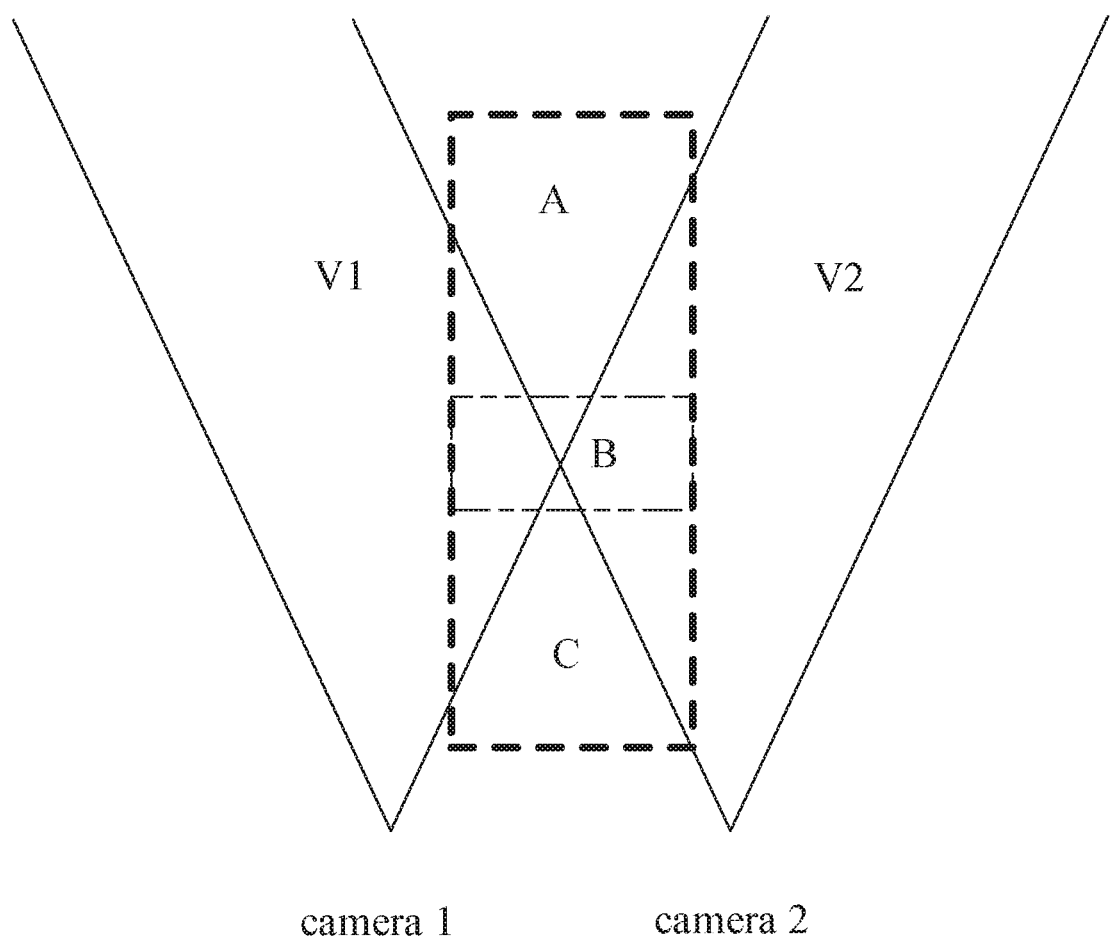
FIG. 7 schematically shows a schematic diagram of a scenario where fields of view of two adjacent camera 1 and camera 2 overlap, according to an embodiment of the first aspect in the present application.

The above may specifically refer to FIG. 7. FIG. 7 schematically shows a schematic diagram of a scenario where fields of view of two adjacent camera 1 and camera 2 overlap, according to an embodiment of the first aspect in the present application. In FIG. 7, the field of view of a camera 1 is represented by V1, a cross section of the field of view is approximately a V-shaped cross-section. Similarly, the field of view of a camera 2 is represented by V2, a cross section of the field of view is also approximately a V-shaped cross section. There are an overlapping area A and non-overlapping areas B in V1 and V2, and a non-covering area C. Here, the case where an obstacle enters the field of view V2 of the camera 2 from the field of view V1 of the camera 1 through the overlapping area A will be discussed firstly. The case where an obstacle enters the field of view V2 of the camera 2 from the field of view V1 of the camera 1 through the non-covering area C or through the non-overlapping area B will be described later.

In the above description, in step 108, i.e. the first obstacle image is associated with the second obstacle image based on an image box feature with respect to the first obstacle image and the second obstacle image, in a case that a field of view of the first camera overlaps with a field of view of the second camera. The reason for associating the obstacle images based on image box feature of the obstacle images captured by the at least two adjacent cameras is to compare the obstacle images captured by the adjacent cameras such as the camera 1 and the camera 2. As a captured frame image may include image boxes of a plurality of obstacles such as pedestrians, non-motor vehicles, other motor vehicles, and so on, associating the obstacle images captured by the adjacent cameras is to associate the image boxes of the same obstacle which are initially determined, for example, to associate the image box of a pedestrian image captured by the camera 1 with the image box of a pedestrian image captured by camera 2, to associate the image box of a bicycle image captured by the camera 1 with the image box of a bicycle image captured by the camera 2, to associate the image box of another motor vehicle image captured by the camera 1 with the image box of another motor vehicle image captured by the camera 2, etc.

For the above-mentioned step 110: a second image box is formed by projecting a first image box of the first obstacle image into an imaging plane of the second camera via a reference coordinate system, and the second image box is compared with a third image box of the second obstacle image, to determine whether the second image box and the third image box include the same obstacle according to an image box feature with respect to the second image box and the third image box, it should be noted here that the reference coordinate system is a generalized concept. The reference coordinate system may include the vehicle body coordinate of the vehicle body coordinate system and the world coordinate of the world coordinate system, as long as the conversion relationship of two adjacent cameras to this coordinate system is known, as already described above. The following is a brief description of the world coordinate system as an example.

For example, the first coordinates (u1, v1) in the imaging plane of the camera 1 can be converted into the world coordinates P (x1, y1, z1) in the world coordinate system via the rotation and translation matrixes R1 and T1, and then the world coordinates P (x1, y1, z1) can be converted into the second coordinates in the imaging plane of the camera 2 via the rotation and translation matrixes R2 and T2. For example, the first coordinates (u1, v1) of the first point in the image box of the obstacle image captured by the camera 1 can be converted into the world coordinates P1 (x1, y1, z1) in the world coordinate system via the rotational translation matrixes R1 and T1, and then the world coordinates P1 (x1, y1, z1) can be converted into the second coordinates (u12, v12) of the first point in the imaging plane of the camera 2 via the rotation and translation matrixes R2 and T2, thereby completing the projection of the first point. Similarly, the first coordinates (u2, v2) of the second point in the image box of the obstacle image captured by the camera 1 can be converted into the world coordinates P2 (x2, y2, z2) in the world coordinate system via the rotation and translation matrixes R1' and T1', and then the world coordinates P2 (x2, y2, z2) can be converted into the second coordinates (u22, v22) of the second point in the imaging plane of the camera 2 via the rotation and translation matrixes R2' and T2', thereby completing the projection of the second point. Similarly, the first coordinates (u3, v3) of the third point in the image box of the obstacle image captured by the camera 1 can be converted into the world coordinates P3 (x3, y3, z3) in the world coordinate system via the rotation and translation matrixes R1" and T1", and then the world coordinates P3 (x3, y3, z3) can be converted into the second coordinates (u32, v32) of the third point in the imaging plane of the camera 2 via the rotation and translation matrix R2" and T2", thereby completing the projection of the third point, etc.

After converting all the first coordinates of the key points in the first image box of the obstacle image captured by the camera 1 into the second coordinates of the key points in the second image box of the imaging plane of the camera 2 via the world coordinate system, the task of projecting the first image box of the obstacle image captured by the camera 1 into the imaging plane of the camera 2 via the reference coordinate system is completed.

It is known how to convert the first coordinates of the key points in the first image box of the obstacle image captured by the camera 1 into the world coordinates in the world coordinate system, and how to convert the world coordinates into the second coordinates of the key points in the second image box in the imaging plane of the camera 2, which are not the major concepts of the present application, and hence are not described herein again.

Figure 8:
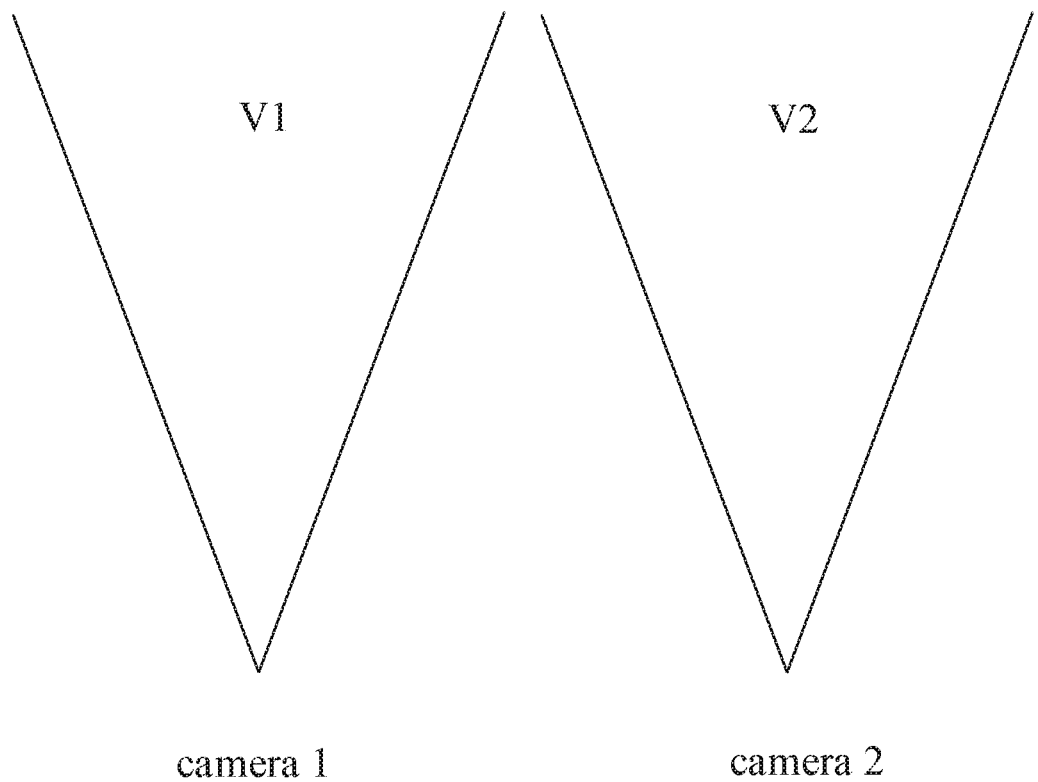
FIG. 8 schematically shows a schematic diagram of a scenario where fields of view of two adjacent camera 1 and camera 2 do not overlap, according to an embodiment of the first aspect in the present application.

FIG. 8 schematically shows a schematic view of a scenario where fields of view of two adjacent camera 1 and camera 2 do not overlap, according to an embodiment of the first aspect in the present application. The area C shown in FIG. 7 is a non-covering area which is not covered by the fields of view of two adjacent camera 1 and camera 2. Similarly, as shown in FIG. 8, the field of view of the camera 1 is represented by V1, a cross section of the field of view is approximately a V-shaped cross section; similarly, the field of view of the camera 2 is represented by V2, a cross section of the field of view is also approximately a V-shaped cross section.

Referring back to FIG. 2, FIG. 2 shows step 112 of associating the first obstacle image with the second obstacle image by estimating a motion equation within a time period from a time when the obstacle just disappears from the field of view of the first camera to a time when the obstacle just enters the field of view of the second camera, in a case that a field of view of the first camera does not overlap with a field of view of the second camera. Further, the step 112 of associating the first obstacle image with the second obstacle image may further include step 114 of converting first coordinates of the first image box of the first obstacle image into reference coordinates of a reference coordinate system; updating continuously the reference coordinates with the estimated motion equation; projecting the latest updated reference coordinates into an imaging plane of the second camera to obtain second coordinates when the obstacle just enters the field of view of the second camera; and comparing the second image box of the first obstacle image formed by the second coordinates with the third image box of the second obstacle image captured at a time when the obstacle just enters the field of view of the second camera, to determine whether the second image box and the third image box include the same obstacle according to an image box feature with respect to the second image box and the third image box.

As mentioned above, in the case that the fields of view V1 and V2 of two adjacent cameras do not overlap, as shown in FIG. 8, or in the non-covering area C which is not covered by the fields of view V1 and V2 of two adjacent cameras, as shown in FIG. 7, a motion equation is estimated to associate the obstacle images within a time period from a time when the obstacle just disappears from the field of view V1 of the camera 1 to a time when the obstacle just enters the field of view V2 of the other camera 2. Here, the obstacle may be moving within a time period from a time when the obstacle just disappears from the field of view V1 of the camera 1 to a time when the obstacle just enters the field of view V2 of the other camera 2. Since the obstacle cannot be captured and tracked by any cameras during this time period, a motion equation for the movement of the obstacle in this time period needs to be estimated. The conditions where the motion equation is estimated are shown in FIG. 3. For example, estimating the motion equation 116 may include estimating the motion equation in condition of a uniform motion 118, estimating the motion equation in condition of a uniformly accelerated motion 120 or estimating the motion equation in condition of a uniformly decelerated motion 122, and so on.

As mentioned above, the first coordinates (u1, v1) of the first point in the image box of the obstacle image captured by the camera 1 are converted into the reference coordinates P (x1, y1, z1) of the reference coordinate system, and then the reference coordinates P (x1, y1, z1) are continuously updated with the estimation of motion equation. For example, assuming that the obstacle is moving at a uniform velocity, the updated reference coordinates of the first point are P (x1+vt, y1+vt, z1+vt), where v is the moving velocity of the obstacle, t is a time period from a time when the obstacle just leaves the field of view V1 of the camera 1 to the current time, and in a case that the obstacle just enters the field of view V2 of the camera 2, t represents the time period from a time when the obstacle just leaves the field of view V1 of the camera 1 to a time when the obstacle just enters the field of view V2 of the camera 2. Similarly, the first coordinates (u2, v2) of the second point in the image box of the obstacle image captured by the camera 1 are converted into the reference coordinates P (x2, y2, z2) of the reference coordinate system, and then the reference coordinates P (x2, y2, z2) are continuously updated with the estimation of motion equation. For example, assuming that the obstacle is moving at a uniform velocity, the updated reference coordinates of the second point are P (x2+vt, y2+vt, z2+vt), where v is the moving velocity of the obstacle, t is the time period from a time when the obstacle just leaves the field of view V1 of the camera 1 to the current time, and in a case that the obstacle just enters the field of view V2 of the camera 2, t represents the time period from a time when the obstacle just leaves the field of view V1 of the camera 1 to a time when the obstacle just enters the field of view V2 of the camera 2. The first coordinates (u3, v3) of the third point in the image box of the obstacle image captured by the camera 1 are converted into the reference coordinates P (x3, y3, z3) of the reference coordinate system, and then the reference coordinates P (x3, y3, z3) are continuously updated with the estimation of motion equation. For example, assuming that the obstacle is moving at a uniform velocity, the updated reference coordinates of the third point are P (x3+vt, y3+vt, z3+vt), where v is the moving velocity of the obstacle, t is a time period from a time when the obstacle just leaves the field of view V1 of the camera 1 to the current time, and in a case that the obstacle just enters the field of view V2 of the camera 2, t represents the time period from a time when the obstacle just leaves the field of view V1 of the camera 1 to a time when the obstacle just enters the field of view V2 of the camera 2, and the like.

After all the reference coordinates of the key points in the image box of the obstacle image captured by the camera 1 are updated to the latest reference coordinates, the step of continuously updating the reference coordinates with the estimation of the motion equation is completed.

When an obstacle just enters the field of view V2 of the other camera, the latest updated reference coordinates such as P(x1+vt, y1+vt, z1+vt), P(x2+vt, y2+vt, z2+vt), P(x3+vt, y3+vt, z3+vt), are projected to the second coordinates such as (u12, v12), (u22, v22), (u32, v32) in the imaging plane of the other camera, and the second image box of the obstacle image, formed by the second coordinates, is compared with the third image box of the obstacle image captured by the other camera, to determine whether the second image box and the third image box include the same obstacle.

The above is described in the case of a uniform motion of the obstacle. Similar methods can be applied in the cases of a uniformly accelerated motion, a uniformly decelerated motion and even a static state of the obstacle, in particular, the second image box of the obstacle image formed by the second coordinates is compared with the third image box of the obstacle image captured by another camera, to determine whether the two image boxes include the same obstacle according to the image box feature of the two image boxes.

Figure 4:
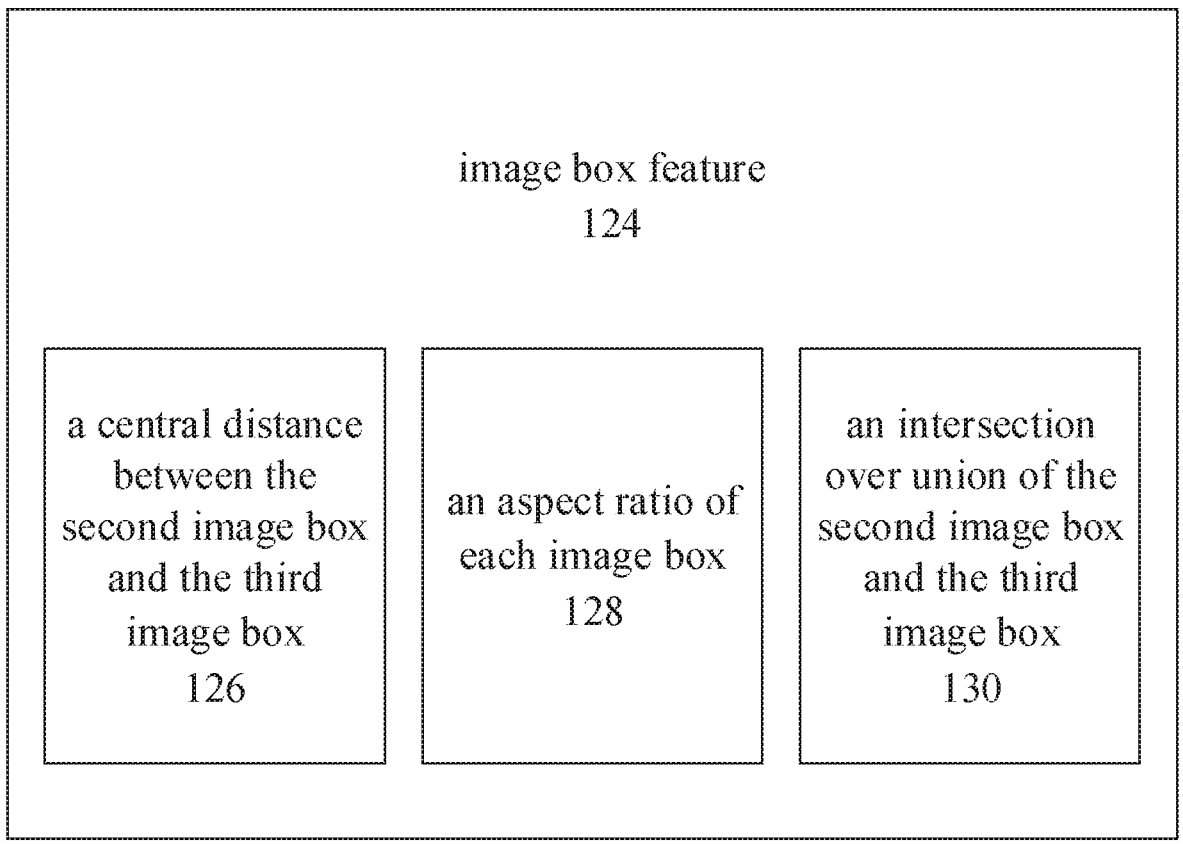
FIG. 4 schematically shows a schematic diagram of an image box feature according to an embodiment of the first aspect in the present application.

A schematic diagram of image box feature 124 is shown in FIG. 4. For example, the image box feature 124 may include a central distance 126 between an image box (i.e., the second image box) in an imaging plane (formed by an obstacle image) of another camera and an image box (i.e., the third image box) of the obstacle image captured by the other camera, an aspect ratio 128 of each image box, and/or an intersection over union of the second image box and the third image box 130.

It should be noted that the first image box of the obstacle image captured by the camera 1 is projected into the imaging plane of another camera 2 via the reference coordinate system to form the second image box, which is often different from the third image box of the obstacle image captured by the other camera 2 itself. For example, the second image box and the third image box do not overlap completely, so there is a central distance between a center of the second image box of the obstacle image and a center of the third image box of the obstacle image captured by the other camera 2 itself. The central distance is one of the indicators for determining whether the second image box and the third image box include the same obstacle. For example, in a case that the central distance is less than a specific threshold, the two image boxes are determined to be for the same obstacle. A specific threshold can be determined according to the circumstances.

The aspect ratio 128 of each image box is also one of the indicators for determining whether the second image box and the third image box include the same obstacle. The closer the aspect ratios of the image boxes are, the more likely the two image boxes are captured for the same obstacle. Similarly, in a case that the aspect ratio 128 of each image box is above a specific threshold, the two image boxes are determined to be for the same obstacle. A specific threshold can be determined according to the circumstances.

The intersection over union 130 refers to the overlapping ratio between the second image box of the obstacle image and the third image box of the obstacle image captured by the other camera 2 itself, that is, the ratio of their intersection to union. The closer the ratio of the intersection over union is to 1, the more likely the two image boxes are captured for the same obstacle. Similarly, in a case that the ratio of the intersection over union is above a specific threshold, the two image boxes are determined to be for the same obstacle. A specific threshold can be determined according to the circumstances.

In an embodiment of the present application, as shown in FIG. 6, step 106 of determining whether the first obstacle image and the second obstacle image include the same obstacle may further include, for example, determining according to a type of the obstacle 132, determining according to a moving velocity of the obstacle 134, determining according to a moving direction of the obstacle 136, and/or determining according to an image box feature 138.

The determining according to a type of an obstacle 132 is, for example, assuming that the obstacle tracked and captured by the camera 1 is a pedestrian, the displayed image box of the obstacle (i.e., the first image box) corresponds to the pedestrian, while the image captured by an adjacent camera 2 includes both the image box of a pedestrian (i.e., the third image box) and the image box of a bicycle. It is sufficient to obtain the image box of the pedestrian in the field of view of the camera 2 (i.e., the second image box) by projecting the first image box into the field of view of the camera 2, and match the second image box with the third image box, to determine whether the pedestrian obstacle image captured by the camera 1 and the pedestrian obstacle image captured by the camera 2 include the same obstacle.

Similarly, assuming that the obstacle captured by the camera 1 is a bicycle, the displayed image box of the obstacle (i.e., the first image box) corresponds to the bicycle, while the image captured by an adjacent camera 2 includes both the image box of a bicycle (i.e., the third image box) and the image box of a pedestrian. It is sufficient to obtain the image box of the bicycle in the field of view of the camera 2 (i.e., the second image box) by projecting the first image box into the field of view of the camera 2, and match the second image box with the third image box, to determine whether the bicycle obstacle image captured by the camera 1 and the bicycle obstacle image captured by the camera 2 include the same obstacle.

It should be noted, no matter whether the fields of view of the adjacent cameras overlap or not, step 106 of determining whether the first obstacle image and the second obstacle image include the same obstacle image includes: forming a second image box by projecting a first image box of the first obstacle image into an imaging plane of the second camera, and then comparing the second image box with a third image box of the second obstacle image, to determine whether the second image box and the third image box include the same obstacle according to an image box feature.

Determining according to a moving velocity of an obstacle 134 indicates that the image captured by a camera includes pedestrians, bicycles, other motor vehicles, trees, and so on. The velocities of these objects are inconsistent. For example, a pedestrian image is captured by the camera 1, and the image box of the pedestrian image is projected into the field of view of the camera 2 to obtain an image box of the pedestrian in the field of view of the camera 2. The moving velocity of a first pedestrian is often different from that of a second pedestrian, so it may be determined whether the first obstacle image captured by the camera 1 and the second obstacle image captured by the camera 2 include the same pedestrian obstacle.

The determining according to the image box feature 138 can refer to the introduction of the image box feature as described above, so it may be determined whether the obstacle image captured by the camera 1 and the obstacle image captured by the camera 2 include the same obstacle.

Here is only a description of adjacent camera 1 and camera 2 as examples. It can be understood by those skilled in the art that the association between adjacent camera 2 and camera 3, between adjacent camera 3 and camera 4, between adjacent camera 4 and camera 5, between adjacent camera 5 and camera 6, between adjacent camera 6 and camera 7, between adjacent camera 7 and camera 8, and between adjacent camera 8 and camera 1 can refer to the manner of association between camera 1 and camera 2. For example, the association in the case that the fields of view of adjacent cameras overlap, and the association in the case that the fields of view of adjacent cameras do not overlap, are described in detail above.

Figure 9:
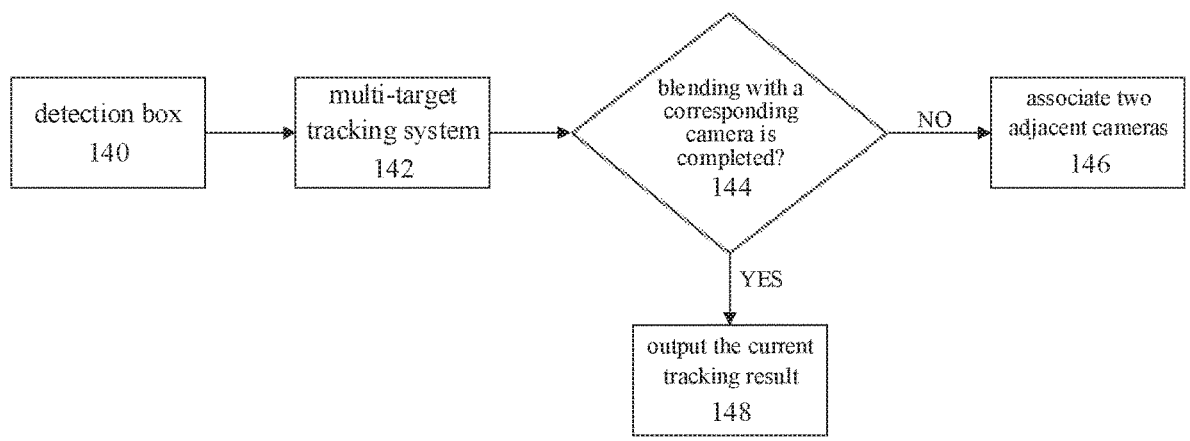
FIG. 9 schematically shows a schematic diagram of blending a plurality of adjacent cameras according to an embodiment of the first aspect in the present application.

FIG. 9 schematically shows a schematic diagram of blending a plurality of adjacent cameras according to an embodiment of the first aspect in the present application. For example, a detection box 140 represents an image box of an obstacle tracked by a camera. A multi-target tracking system 142 is formed by means of multiple cameras, for example, simultaneously tracking pedestrians, bicycles, electric cars, trees, other motor vehicles and non-motor vehicles, etc. By means of the method or system for sensing an obstacle according to one aspect of the present application, it is necessary to determine whether blending with a corresponding camera is completed 144, that is, whether the step 106 of determining whether the first obstacle image and the second obstacle image include the same obstacle is completed. As mentioned above, the association or blending is completed until the associations between adjacent camera 1 and camera 2, between adjacent camera 2 and camera 3, between adjacent camera 3 and camera 4, between adjacent camera 4 and camera 5, between adjacent camera 5 and camera 6, between adjacent camera 6 and camera 7, adjacent camera 7 and camera 8, and between adjacent camera 8 and camera 1 are all completed. In a case that all of the associations are not yet completed, association between adjacent cameras 146 is continued. If all of the associations are completed, the current tracking result is outputted 148.

It should be noted that the association or blending is completed until the above-mentioned associations between the adjacent camera 1 and camera 2, between the adjacent camera 2 and camera 3, between the adjacent camera 3 and camera 4, between the adjacent camera 4 and camera 5, between the adjacent camera 5 and camera 6, between the adjacent camera 6 and camera 7, between the adjacent camera 7 and camera 8, and between the adjacent camera 8 and camera 1 are all completed, which is an embodiment for sensing an obstacle within 360° around the motor vehicle. In some cases, for example, if it is only required to sense the obstacles on the left side of the motor vehicle 8, it is sufficient to associate between the adjacent camera 8 and camera 1, between the adjacent camera 1 and camera 2, and between the adjacent camera 2 and camera 3. In some cases, for example, if it is only required to sense the obstacles on the right side of the motor vehicle 8, it is sufficient to associate between adjacent camera 5 and camera 6, between adjacent camera 6 and camera 7, and between adjacent camera 7 and camera 8.

According to a second aspect of the present application, a system for sensing an obstacle 300 is provided, as schematically shown in FIG. 10, and may include: at least two adjacent cameras such as cameras 1-8 arranged on a motor vehicle 8, the adjacent cameras including first and second cameras, configured to continuously capture obstacles around the motor vehicle, to obtain at least a first obstacle image and a second obstacle image respectively; an association unit 302, configured to associate the first obstacle image with the second obstacle image; and a determination unit 304, configured to determine whether the first obstacle image and the second obstacle image include the same obstacle.

According to an embodiment of the second aspect of the present application, the association unit 302 is further configured to associate the first obstacle image with the second obstacle image based on an image box feature with respect to the first obstacle image and the second obstacle image, in the case that a field of view of the first camera overlaps with a field of view of the second camera.

According to another embodiment of the second aspect of the present application, the association unit 302 is further configured to form a second image box by projecting a first image box of the first obstacle image into an imaging plane of the second camera via a reference coordinate system, and to compare the second image box with a third image box of the second obstacle image, to determine whether the second image box and the third image box include the same obstacle according to an image box feature with respect to the second image box and the third image box.

According to another embodiment of the second aspect of the present application, the association unit 302 is further configured to, in a case that a field of view of the first camera does not overlap with a field of view of the second camera, associate the first obstacle image with the second obstacle image by estimating a motion equation within a time period from a time when the obstacle just disappears from the field of view of the first camera to a time when the obstacle just enters the field of view of the second camera.

According to another embodiment of the second aspect of the present application, the association unit 302 is further configured to convert first coordinates of the first image box of the first obstacle image into reference coordinates of a reference coordinate system, update continuously the reference coordinates with the estimated motion equation, project the latest updated reference coordinates into an imaging plane of the second camera to obtain second coordinates when the obstacle just enters the field of view of the second camera, and compare the second image box of the first obstacle image formed by the second coordinates with the third image box of the second obstacle image captured at a time when the obstacle just enters the field of view of the second camera, to determine whether the second image box and the third image box include the same obstacle according to an image box feature with respect to the second image box and the third image box.

Alternatively, the estimating a motion equation includes estimating a motion equation in condition of a uniform motion, a uniformly accelerated motion or a uniformly decelerated motion.

According to an embodiment of the second aspect of the present application, the image box feature may include a central distance between the second image box and the third image box, an aspect ratio of each image box, and/or an intersection over union of the second image box and the third image box.

Alternatively, the at least two cameras are arranged on the left front, on the left rear, on the front, on the rear, on the right front, and on the right rear of a body of the motor vehicle, respectively, to sense obstacles within 360° around the body of the motor vehicle.

Alternatively, the determination unit is further configured to determine whether the first obstacle image and the second obstacle image include the same obstacle image according to a type of the obstacle, a moving velocity of the obstacle, a moving direction of the obstacle, and/or an image box feature.

According to an embodiment of the third aspect of the present application, a computer device is provided, which may include: one or more processors; a storage device configured to store one or more programs; the one or more programs, when executed by the one or more processors, cause the one or more processors to implement the above method.

According to an embodiment of the fourth aspect of the present application, a computer readable storage medium is provided, in which a computer program is stored, the computer program, when executed by a processor, causes the processor to implement the method described above.

Figure 11:
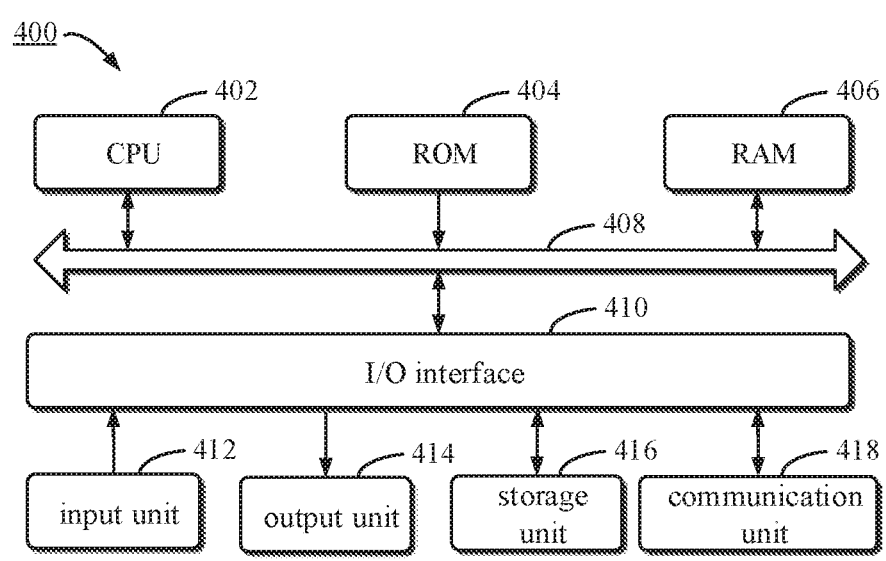
FIG. 11 schematically shows an embodiment of a computer device according to a third aspect of the present application.

For example, FIG. 11 shows a schematic block diagram of an example computer device 400 that can be used to implement embodiments of the present disclosure. It should be understood that a computer device 400 may be used to implement a method 100 for sensing an obstacle described in some embodiments of this disclosure. As shown, the computer device 400 includes: a central processing unit (CPU) 402 that can perform various appropriate actions and processes according to a computer program instruction stored in a read-only memory (ROM) 404 or loaded from a storage unit 416 into a random access memory (RAM) 406. In the RAM 406, various programs and data required for the operation of the computer device 400 can also be stored. The CPU 402, the ROM 404, and the RAM 406 are connected to each other by a bus 408. An input/output (I/O) interface 410 is also connected to the bus 408.

A plurality of components in the computer device 400 are connected to the I/O interface 410, the components include: an input unit 412, such as a keyboard, a mouse, etc.; an output unit 414, such as various types of displays, speakers, etc.; a storage unit 416, such as a magnetic disk, an optical disk, etc.; and a communication unit 418, such as a network card, a modem, a wireless communication transceiver, etc. The communication unit 418 allows the computer device 400 to exchange information/data with other devices through computer networks such as the Internet and/or various telecommunication networks.

The central processing unit 402 executes the methods and processes described above, such as the method 100. For example, in some embodiments, the method 100 may be implemented as a computer software program that is materially contained in a machine-readable medium, such as a storage unit 416. In some embodiments, a part or all of the computer program may be loaded into and/or installed on the computer device 400 via the ROM 404 and/or the communication unit 418. When a computer program is loaded into RAM 406 and executed by CPU 62, one or more actions or steps of method 100 described above may be performed. Alternatively, in other embodiments, the CPU 402 may be configured to execute the method 100 in any other suitable manner (e.g. by means of firmware).

The functions described above can be performed at least in part by one or more hardware logic components. For example, types of hardware logic components that can be used are: Field programmable gate arrays (FPGAs), application specific integrated circuits (ASICs), application specific standard products (ASSPs), system-on-chip systems (SOCs), load programmable logic devices (CPLDs), and the like.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for sensing an obstacle, comprising:
capturing continuously, by at least two cameras comprising first and second cameras adjacently arranged on a motor vehicle, obstacles around the motor vehicle, to obtain at least a first obstacle image and a second obstacle image respectively;
associating the first obstacle image captured by the first camera with the second obstacle image captured by the second camera;
determining whether the first obstacle image captured by the first camera and the second obstacle image captured by the second camera comprise the same obstacle,
wherein in response to determining that a field of view of the first camera does not overlap with a field of view of the second camera, the first obstacle image captured by the first camera is associated with the second obstacle image captured by the second camera by estimating a motion equation within a time period from a time when the obstacle just disappears from the field of view of the first camera to a time when the obstacle just enters the field of view of the second camera.

2. The method according to claim 1, wherein the associating the first obstacle image captured by the first camera with the second obstacle image captured by the second camera comprises:
associating the first obstacle image captured by the first camera with the second obstacle image captured by the second camera based on an image box feature with respect to the first obstacle image and the second obstacle image, in response to determining that a field of view of the first camera overlaps with a field of view of the second camera.

3. The method according to claim 2, wherein the associating the first obstacle image captured by the first camera with the second obstacle image captured by the second camera based on an image box feature with respect to the first obstacle image and the second obstacle image comprises:
forming a second image box by projecting a first image box of the first obstacle image captured by the first camera into an imaging plane of the second camera via a reference coordinate system, and comparing the second image box with a third image box of the second obstacle image captured by the second camera, to determine whether the second image box and the third image box comprise the same obstacle according to an image box feature with respect to the second image box and the third image box.

4. The method according to claim 1, wherein the associating the first obstacle image captured by the first camera with the second obstacle image captured by the second camera comprises:
converting first coordinates of the first image box of the first obstacle image into reference coordinates of a reference coordinate system;
updating continuously the reference coordinates with the estimated motion equation;
projecting the latest updated reference coordinates into an imaging plane of the second camera to obtain second coordinates when the obstacle just enters the field of view of the second camera; and
comparing the second image box of the first obstacle image formed by the second coordinates with the third image box of the second obstacle image captured at a time when the obstacle just enters the field of view of the second camera, to determine whether the second image box and the third image box comprise the same obstacle according to an image box feature with respect to the second image box and the third image box.

5. The method according to claim 4, wherein the estimating a motion equation comprises estimating a motion equation in condition of a uniform motion, a uniformly accelerated motion or a uniformly decelerated motion.

6. The method according to claim 2, wherein the image box feature comprises a central distance between the second image box and the third image box, an aspect ratio of each image box, and/or an intersection over union of the second image box and the third image box.

7. The method according to claim 1, wherein the at least two cameras are arranged on the left front, on the left rear, on the front, on the rear, on the right front, and on the right rear of a body of the motor vehicle, respectively, to sense obstacles within 360° around the body of the motor vehicle.

8. The method according to claim 1, wherein the determining whether the first obstacle image captured by the first camera and the second obstacle image captured by the second camera comprise the same obstacle image comprises:
determining whether the first obstacle image captured by the first camera and the second obstacle image captured by the second camera comprise the same obstacle image according to a type of the obstacle, a moving velocity of the obstacle, a moving direction of the obstacle, and/or an image box feature.

9. A system for sensing an obstacle, comprising:
at least two cameras comprising first and second cameras adjacently arranged on a motor vehicle, configured to continuously capture obstacles around the motor vehicle, to obtain at least a first obstacle image and a second obstacle image respectively;
one or more processors; and
a storage device configured to store one or more programs, that, when executed by the one or more processors, cause the one or more processors to:
associate the first obstacle image captured by the first camera with the second obstacle image captured by the second camera; and
determine whether the first obstacle image captured by the first camera and the second obstacle image captured by the second camera comprise the same obstacle,
wherein the one or more programs, when executed by the one or more processors, cause the one or more processors further to:
in response to determining that a field of view of the first camera does not overlap with a field of view of the second camera, associate the first obstacle image captured by the first camera with the second obstacle image captured by the second camera by estimating a motion equation within a time period from a time when the obstacle just disappears from the field of view of the first camera to a time when the obstacle just enters the field of view of the second camera.

10. The system according to claim 9, wherein the one or more programs, when executed by the one or more processors, cause the one or more processors further to:
associate the first obstacle image captured by the first camera with the second obstacle image captured by the second camera based on an image box feature with respect to the first obstacle image and the second obstacle image, in response to determining that a field of view of the first camera overlaps with a field of view of the second camera.

11. The system according to claim 10, wherein the one or more programs, when executed by the one or more processors, cause the one or more processors further to:
form a second image box by projecting a first image box of the first obstacle image captured by the first camera into an imaging plane of the second camera via a reference coordinate system, and to compare the second image box with a third image box of the second obstacle image captured by the second camera, to determine whether the second image box and the third image box comprise the same obstacle according to an image box feature with respect to the second image box and the third image box.

12. The system according to claim 9, wherein the one or more programs, when executed by the one or more processors, cause the one or more processors further to:
convert first coordinates of the first image box of the first obstacle image into reference coordinates of a reference coordinate system,
update continuously the reference coordinates with the estimated motion equation,
project the latest updated reference coordinates into an imaging plane of the second camera to obtain second coordinates when the obstacle just enters the field of view of the second camera, and
compare the second image box of the first obstacle image formed by the second coordinates with the third image box of the second obstacle image captured at a time when the obstacle just enters the field of view of the second camera, to determine whether the second image box and the third image box comprise the same obstacle according to an image box feature with respect to the second image box and the third image box.

13. The system according to claim 12, wherein the estimating a motion equation comprises estimating a motion equation in condition of a uniform motion, a uniformly accelerated motion or a uniformly decelerated motion.

14. The system according to claim 10, wherein the image box feature comprises a central distance between the second image box and the third image box, an aspect ratio of each image box, and/or an intersection over union of the second image box and the third image box.

15. The system according to claim 9, wherein the at least two cameras are arranged on the left front, on the left rear, on the front, on the rear, on the right front, and on the right rear of a body of the motor vehicle, respectively, to sense obstacles within 360° around the body of the motor vehicle.

16. The system according to claim 9, wherein the one or more programs, when executed by the one or more processors, cause the one or more processors further to:
determine whether the first obstacle image captured by the first camera and the second obstacle image captured by the second camera comprise the same obstacle image according to a type of the obstacle, a moving velocity of the obstacle, a moving direction of the obstacle, and/or an image box feature.

17. A non-transitory computer-readable storage medium, in which a computer program is stored, wherein the computer program, when executed by a processor, causes the processor to implement the method of claim 1.

* * * * *